W. G. NICHOLS.
PROCESS OF MAKING MANGANESE STEEL.
APPLICATION FILED JUNE 21, 1920.
1,356,551.
Patented Oct. 26, 1920.
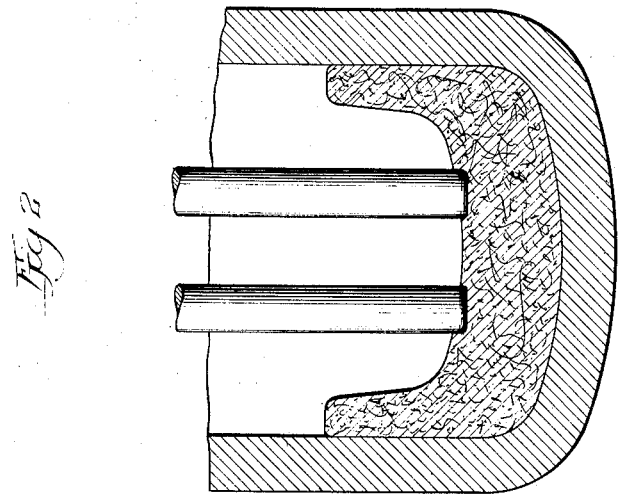
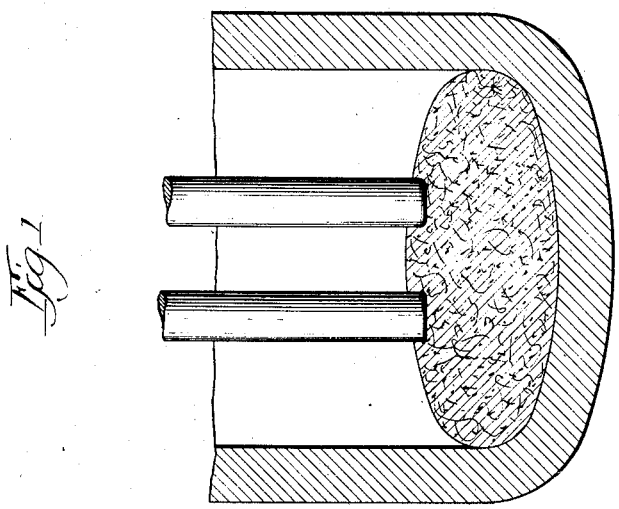
Witnesses:
Inventor
Wesley G. Nichols,

UNITED STATES PATENT OFFICE.

WESLEY G. NICHOLS, OF CHICAGO, ILLINOIS, ASSIGNOR TO AMERICAN MANGANESE STEEL COMPANY, OF CHICAGO, ILLINOIS, A CORPORATION OF MAINE.

PROCESS OF MAKING MANGANESE STEEL.

1,356,551.     Specification of Letters Patent.     Patented Oct. 26, 1920.

Application filed June 21, 1920. Serial No. 390,359.

*To all whom it may concern:*

Be it known that I, WESLEY G. NICHOLS, a citizen of the United States, residing at Chicago, in the county of Cook and State of Illinois, have invented certain new and useful Improvements in Processes of Making Manganese Steel, of which the following is a specification.

The present improvement relates to the manufacture of manganese steel and particularly to the manufacture of such steel in whole or in part from manganese steel scrap.

One object of the invention is to provide an improved method of saving and utilizing the metallic manganese contained in the manganese steel scrap while utilizing such scrap to make new manganese steel.

Another object is to provide a method of introducing manganese into a steel bath, and particularly a manganese steel, without obtaining an excess of carbon in the analysis.

Heretofore, it has been customary in reclaiming manganese steel scrap, to melt some ordinary steel scrap with the manganese steel scrap, either by melting first the ordinary steel scrap and adding the manganese steel scrap in installments, or by melting the ordinary steel scrap with the manganese steel scrap; then adding ferromanganese in sufficient quantity to alloy the ordinary steel scrap and to make up any loss of manganese which may have occurred during the melting.

I have found, on the one hand, that when a bath of ordinary scrap is first prepared and then the manganese steel charged in installments, the procedure is very severe on the furnace and roof, because every installment of manganese scrap has a tendency to freeze or to form a skull on the bottom of the furnace which requires an excessive temperature to remove it; also that this heat tends to oxidize and therefore waste the manganese in the manganese steel scrap. Moreover, this method is slow and is attended by a great loss of heat and a large consumption of electricity. On the other hand, the method heretofore proposed of melting the manganese steel scrap with the ordinary steel scrap and then adding ferromanganese to alloy the ordinary steel scrap is not practicable with the commercial grade of ferro-manganese having 78 to 80 per cent. manganese, 6 to 6.75 per cent. carbon and 12 to 16 per cent. iron, because the carbon in the finished product will be too high; it being well known that a high carbon content in manganese steel will cause brittleness, thereby rendering the steel unsuitable for the purposes intended. This is explained by the fact that in melting a charge of ordinary steel scrap and manganese steel scrap even in the electric furnace, there is some loss of manganese without any loss of carbon. The carbon cannot be reduced or eliminated, because the manganese would oxidize before the carbon, and then, on the addition of the ferro-manganese, still more carbon is added, and this, with the carbon already in the bath, gives a high carbon manganese steel that is unsuitable for commercial purposes.

By my improved method, I can melt a charge of ordinary steel scrap and manganese steel scrap, then add the ferro-manganese to alloy the ordinary steel scrap; or I can melt an entire charge of manganese scrap, with or without the addition of ferro-manganese, depending on the manganese content of the scrap to be melted, and obtain a finished product in which the carbon is sufficiently low to give a tough steel with the manganese content of the correct percentage. It has been proved that this can be accomplished only by my improved method. There are two conditions of primary importance in carrying out the process, namely, first, the use of manganese ore as the source of manganese to bring the alloy up to analysis; and secondly, the use of low voltage in operating the furnace. These conditions are essential to a successful working of the process. Other steps hereinafter indicated are important as helping to insure the fullest measure of success in the process.

In carrying out this improved process of manufacturing manganese steel, I use the electric furnace of either the arc or induction type, so that heat required for melting will not depend on the combustion of fuel with oxygen of the air.

Prior to charging the furnace, I prefer to have all the scrap (both ordinary steel and manganese steel) which goes to make up the charge, put through a rattler or tumbling barrel to remove sand, rust and foreign matter, as I have found that by so doing, there is less cutting action on the furnace lining, the slag contains less oxids, the deoxidation period is shortened, and the quantity of reducing agents required is reduced to a minimum.

In charging a mixture of ordinary steel scrap and manganese steel scrap, I put all of the ordinary steel on the bottom of the furnace, then charge the heavy and large pieces of manganese steel scrap, and finish by charging the light and small pieces on top. Great care is taken in charging to have the scrap piled up along the walls of the furnace, leaving the space between the electrodes low. By so arranging the charge the side walls are protected from radiation during the melting down of the scrap, and the entire charge is melted at about the same time. This prevents localizing of excessive heat which would increase oxidation of manganese in the manganese steel scrap. This may well be illustrated by the two diagrams of the accompanying drawing, wherein—

Figure 1 illustrates the improper charging with low sides to the charge and furnace walls exposed to radiation from the electrodes; and Fig. 2 shows the proper method with high sides to the charge which protect the furnace walls from radiation.

With an entire charge of manganese steel scrap, I place the large heavy pieces on the bottom of the furnace and the light small pieces on the top, arranging the form of the charge the same as in the mixed charge.

When using a mixed charge of ordinary steel and manganese steel scrap, I charge a predetermined amount of manganese ore and lime on top of the ordinary steel. However, it is not absolutely necessary to charge all the ore at this time. Some of it may be charged during the charging of the manganese steel scrap and some of it may be charged even during the melting down period. Also it is not absolutely necessary to charge all the predetermined amount of lime on top of the ordinary scrap. Some of it may be charged during the charging of the manganese steel scrap.

With an entire charge of manganese steel scrap, I prefer to charge the manganese ore and lime during the charging of the scrap.

The amount of manganese ore is governed by the manganese content of the ore, the amount of manganese steel scrap in the charge and manganese content of the scrap.

The amount of lime used is governed by the condition of the scrap, that is, how free from sand, rust and foreign matter it is, enough lime being charged to form a slag, as soon as the charge starts to melt.

Having charged the furnace as outlined above, care is used to obtain a temperature of not more than 1200° F., until practically the entire charge has reached that temperature. Unavoidably pools of metal may form directly under the electrodes prior to the entire charge reaching 1200° F., but as soon as such pools do form, I cover same with lime, thereby protecting the metal from oxidation.

Immediately after the charge has reached 1200° F., the manganese steel will begin to assume a mushy or broken-down condition. I then increase the temperature, preferably by raising the amperage. I also charge more lime to insure a sufficient slag covering for the metal when melted. This method of melting, I have found, conserves the manganese in the manganese steel, and is explained as follows:

By using low voltage and a low amperage at the beginning, it gives the manganese steel a chance to absorb all the heat without the outside surface becoming melted before the center has hardly reached red. This is especially true of the large pieces.

By insuring a sufficient slag covering to protect the metal, as soon as the entire charge is in a fluid state, the bath will be protected against oxidation and any manganese which has passed into the slag will be precipitated. The slag covering may be secured by charging more and more lime as soon as the charge becomes fluid and at frequent intervals charging fine coke dust, coal or other carbonaceous material in very small amounts distributed evenly over the slag. Fine ferro-silicon can be used along with the coke to cause this reaction. When a test shows the slag to be fairly free from manganese oxide, the ferro-manganese may be charged cold, preheated, or in the molten state. If the ferro-manganese is charged cold or preheated, said charging can be started when the slag is fairly full of oxides and coke dust can be added during the charging of the ferro-manganese. If the ferro-manganese is in the molten state, then the slag should be practically free from oxids, in order that the heat may be teemed immediately ferro-manganese is in and a test shows proper pouring temperature.

The function of the manganese ore added, as stated, in melting either a mixed charge of ordinary steel and manganese steel scrap, or a charge composed entirely of manganese steel scrap, is to replace a certain percentage of the manganese that will unavoidably oxidize, regardless of how perfectly the furnace is working. As this loss of manganese is not attended by any loss of carbon, the bath, when the charge is melted, will be high in carbon in proportion to the manganese content. The addition of ferro-manganese may replace oxidized manganese, but it also gives the bath more carbon. Hence, while the proportion of carbon to manganese in ferro-manganese may be correct for the manufacture of commercial manganese steel from ordinary steel, this source of manganese is not adapted to be added to a bath in which the carbon is already in excess of the manganese, because the final product would likewise contain such excess of carbon.

This may be explained in another way. Assume that no manganese scrap is used in the charge, but same consists of ordinary steel scrap of about .25 to .30 carbon. Now, if we do not reduce this carbon to .10% or under before charging the ferro-manganese, the final product will be too high in carbon, because with a mixed charge of ordinary and manganese steel scrap it is impossible to reduce the carbon in the ordinary steel scrap, without oxidizing and wasting the manganese of the manganese steel scrap before the carbon could be reduced. But by having the manganese ore present with the scrap at the time of melting down, there is obtained the benefit of a large percentage of the manganese in the ore, without any addition of carbon. An excess of carbon in the bath is avoided, and there is no carbon with a ferro-manganese addition to increase the carbon to excess in the final product.

In case of an entire charge of manganese scrap, only enough manganese ore is used to compensate for the manganese oxidized during the melting down period.

The importance of the low voltage will be apparent from the following: In melting manganese scrap, either in an open hearth, or electric or any other furnace in which excessive heat can be obtained, the outside of the large pieces of manganese scrap will melt in some cases before the center is hardly red. This melting of the outside is accompanied by a great loss of manganese. This has been found true, even with the relatively inert environment of an electric furnace, because when melting down under a high voltage, the large pieces of scrap cannot absorb the heat as fast as generated and the manganese in the outer portions of the piece will be burned and a large loss of manganese will take place. By using low voltage, the heat can be so regulated that the pieces will absorb all the heat generated, and the entire piece will be in a mushy or broken down condition before any part of it starts to melt; then it will pass in a fluid condition only when it can be protected from oxidation by a covering of basic slag.

The following table of conditions incident to several heats conducted by me in accordance with the present invention will serve to illustrate the same:

|  | Heat 98. | Heat 105. | Heat 114. | Heat 165. | Heat 195. |
|---|---|---|---|---|---|
| Percentage of manganese scrap | 70 | 70 | 50 | 100 | 100. |
| Condition | Not rattled | Rattled | Fair | Ideal | Ideal. |
| How charged | On top | Center | Center |  |  |
| Current on | 9:35 a. m. | 3:35 p. m. | 1:40 p. m. | 2:00 p. m. | 7:45 p. m. |
| Contact | 10:05 a. m. | At once | 2:30 p. m. | At once | 8:30 p. m. |
| Melted | 1:15 p. m. | 6:15 p. m. | 4:35 p. m. | 4:40 p. m. | 10:30 p. m. |
| Tapped | 2:20 p. m. | 8:05 p. m. | 6:30 p. m. | 5:50 p. m. | 11:50 p. m. |
| Total time | 4 hours 45 min. | 4 hours 30 min. | 4 hours 50 min. | 3 hours 50 min. | 4 hours 5 min. |
| Time first charge lime | 11:05 a. m. | In charge 40 lbs. | In charge 80 lbs. | In charge 120 lbs. | In charge 250 lbs. |
| Time first charge manganese ore | 12:00 noon | In charge 40 lbs. | In charge 100 lbs. | In charge 200 lbs. | In charge 200 lbs. |
| Time first charge scale | 11:05 a. m. | 6:05 p. m. | 3:35 p. m. | In charge 40 lbs. |  |
| Time first charge fluorspar | 12:50 p. m. | 5:35 p. m. | 3:35 p. m. | 4:55 p. m. | 10:15 p. m. |
| Time first charge sand | 1:05 p. m. | 6:35 p. m. | 4:35 p. m. | 5:00 p. m. |  |
| Time first charge coke | 12:55 p. m. | 6:35 p. m. | 4:35 p. m. | 5:00 p. m. | 10:30 p. m. |
| Time first charge ferro-silicon |  |  |  | 2 lbs. fine, 5:00 p. m. | 30 lbs. fine, 10:45 p. m. |
| Time first charge ferro-manganese | 1:55 p. m. | 7:30 p. m. |  | 5:30 p. m. |  |
| Total amount lime | 145 lbs. | 215 lbs. | 305 lbs. | 280 lbs. | 465 lbs. |
| Total amount manganese ore | 60 lbs. | 170 lbs. | 200 lbs. | 200 lbs. | 250 lbs. |
| Total amount scale | 30 lbs. | 95 lbs. | 40 lbs. | 40 lbs. |  |
| Total amount fluorspar | 15 lbs. | 40 lbs. | 60 lbs. | 60 lbs. | 50 lbs. |
| Total amount sand | 30 lbs. | 25 lbs. | 35 lbs. | 15 lbs. |  |
| Total amount coke | 155 lbs. | 110 lbs. | 150 lbs. | 55 lbs. | 85 lbs. |
| Total amount ferro-silicon | 25 lbs. | 50 lbs. | 40 lbs. | 30 lbs. | 65 lbs. |
| Total amount ferro-manganese | 332 lbs. | 395 lbs. | 555 lbs. | 80 lbs. | 50 lbs. |
| Final slag |  | Light green | Blue green | Powder | Powder. |
| Final temperature | 40 sec. | 40 sec. | 30 sec. | 35 sec. | 55 sec. |
| Theoretical manganese | 13.29 | 13.22 | 12.62 | 13.09 | 13.33. |
| Actual | 11.86 | 12.55 | 12.39 | 12.19 | 12.59. |
| Theoretical carbon | 1.25 | 1.29 | 1.24 | 1.29 | 1.24. |
| Actual | 1.21 | 1.29 | 1.23 | 1.22 | 1.13. |
| Amount tapped | 5655 | 6200 | 6370 | 6860 | 6840. |
| K. W. H. used | 2500 | 3000 | 3000 | 2500 | 2000. |
| K. W. H. per ton | 887 | 968 | 938 | 735 | 588. |
| Time per ton | 1 hour 40 min. | 1 hour 25 min. | 1 hour 35 min. | 1 hour 5 min. | 1 hour 10 min. |
| Remarks | 30 min. delay, electrode trouble. |  | Ordinary scrap rattled. | Current off 30 min., electrode trouble. Pre. test 5:05 p. m., manganese 11.02, carbon 1.12. | Low voltage. |

I claim:

1. The process of making manganese steel, which consists in melting manganese steel scrap and adding manganese ore in quantity to restore to the ultimate bath the desired proportion of manganese.

2. The process of making manganese steel, which consists in melting manganese steel scrap and adding manganese ore in quantity to restore to the ultimate bath the desired proportion of manganese, the manganese ore being added prior to the melting.

3. The process of making manganese steel, which consists in melting the two kinds of steel and adding manganese ore to the bath containing both said steels and in proportion to insure the desired manganese content in the resultant steel.

4. The process of making manganese steel, which consists in melting manganese steel scrap and adding manganese ore in quantity to restore to the ultimate bath the desired proportion of manganese, the fusing of the metal being conducted at a temperature proportionate to the distribution of heat through the mass.

5. The process of making manganese steel, which consists in melting manganese steel at a temperature that brings the entire mass substantially at one time to the soft state, and in the presence of manganese ore, applying a covering of slagging material to the bath, and raising the temperature to a degree sufficient to fully fuse the metal and ore.

6. The process of making manganese steel, which consists in melting manganese steel at a temperature that brings the entire mass substantially at one time to the soft state, and in the presence of manganese ore, applying a covering of slagging material with an oxid reducing agent, to the bath, and raising the temperature to a degree sufficient to fully fuse the metal and ore.

Signed at Chicago, Illinois, this 17th day of June, 1920.

WESLEY G. NICHOLS.